United States Patent
Gupta

(10) Patent No.: US 12,524,131 B2
(45) Date of Patent: Jan. 13, 2026

(54) AUTOMATIC FEEDBACK SYSTEM USING VISUAL INTERACTIONS

(71) Applicant: eBay Inc., San Jose, CA (US)

(72) Inventor: Neeraj Gupta, Milpitas, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/388,655

(22) Filed: Nov. 10, 2023

(65) Prior Publication Data

US 2024/0077990 A1    Mar. 7, 2024

Related U.S. Application Data

(63) Continuation of application No. 18/085,390, filed on Dec. 20, 2022, now Pat. No. 11,853,532, which is a
(Continued)

(51) Int. Cl.
 *G06F 3/0482* (2013.01)
 *G06F 3/0486* (2013.01)
 (Continued)

(52) U.S. Cl.
 CPC .......... *G06F 3/0482* (2013.01); *G06F 3/0486* (2013.01); *G06F 18/22* (2023.01); *G06F 40/166* (2020.01)

(58) Field of Classification Search
 CPC ...... G06F 40/169; G06F 3/048; G06F 40/166; G06F 18/22; G06F 3/0486
 See application file for complete search history.

(56) References Cited

U.S. PATENT DOCUMENTS 8,522,134 B1    8/2013  Zetlen
8,566,329 B1 *  10/2013 Freed ................ G06F 16/24578
                                                     707/913
(Continued)

FOREIGN PATENT DOCUMENTS

CN     114117288     3/2022
EP       3961541     3/2024
(Continued)

OTHER PUBLICATIONS

"U.S. Appl. No. 17/004,265, Non Final Office Action mailed Jun. 23, 2021", 16 pgs.
(Continued)

*Primary Examiner* — Tadesse Hailu
(74) *Attorney, Agent, or Firm* — SCHWEGMAN LUNDBERG & WOESSNER, P.A.

(57) ABSTRACT

Systems and methods for generating feedback for a webpage based on visual interactions on the webpage are provided. In example embodiments, a user interface (UI) displaying the webpage is presented. The system receives an indication of a selection of an edit trigger and configures the webpage to receive feedback (e.g., one or more user inputs applied to webpage) from the user in response. The user inputs are received, whereby each user input is associated with an identifier of the webpage and coordinates of a location within the webpage. The system processes the user inputs including generating a feedback preview that displays each of the user inputs organized based on a corresponding feedback type. The feedback preview is displayed to the user for approval. Approval of at least a portion of the feedback on the feedback preview will cause the approved feedback to be transmitted to a corresponding entity.

20 Claims, 9 Drawing Sheets

Related U.S. Application Data continuation of application No. 17/004,265, filed on Aug. 27, 2020, now Pat. No. 11,556,223.

(51) Int. Cl.
*G06F 18/22* (2023.01)
*G06F 40/166* (2020.01)

(56) References Cited

U.S. PATENT DOCUMENTS

| | | | |
|---|---|---|---|
| 8,640,023 B1 | 1/2014 | Murray | |
| 8,713,438 B1 | 4/2014 | Broniek et al. | |
| 8,799,765 B1 | 8/2014 | Macinnis et al. | |
| 9,058,327 B1* | 6/2015 | Lehrman | G06F 16/353 |
| 9,396,279 B1 | 7/2016 | O'donnell | |
| 9,720,964 B1 | 8/2017 | Hansen et al. | |
| 9,940,320 B2 | 4/2018 | Krishnamurthy et al. | |
| 10,019,716 B1 | 7/2018 | Ainslie et al. | |
| 10,481,379 B1 | 11/2019 | Putman et al. | |
| 10,496,716 B2* | 12/2019 | Lytkin | G06Q 50/01 |
| 11,556,223 B2 | 1/2023 | Gupta | |
| 11,630,552 B1* | 4/2023 | Clediere | G06Q 30/0601 |
| | | | 715/753 |
| 11,853,532 B2* | 12/2023 | Gupta | G06Q 30/0201 |
| 2005/0114325 A1* | 5/2005 | Liu | G06F 16/583 |
| 2007/0127693 A1* | 6/2007 | D'Ambrosio | G06Q 30/02 |
| | | | 379/265.06 |
| 2008/0222542 A1 | 9/2008 | Woolf et al. | |
| 2009/0292584 A1* | 11/2009 | Dalal | G06Q 30/0201 |
| | | | 705/7.29 |
| 2011/0066957 A1 | 3/2011 | Prats et al. | |
| 2011/0295790 A1 | 12/2011 | Zillner | |
| 2012/0151383 A1* | 6/2012 | Kazan | G06Q 10/101 |
| | | | 715/753 |
| 2012/0324334 A1 | 12/2012 | Leper et al. | |
| 2013/0042171 A1 | 2/2013 | Yang et al. | |
| 2013/0073336 A1* | 3/2013 | Heath | G06Q 30/02 |
| | | | 705/7.29 |
| 2013/0080871 A1 | 3/2013 | Howarth et al. | |
| 2013/0137419 A1 | 5/2013 | Roa et al. | |
| 2013/0262258 A1* | 10/2013 | Jennings | G06Q 30/0601 |
| | | | 705/26.4 |
| 2013/0262588 A1* | 10/2013 | Barak | H04L 51/52 |
| | | | 709/204 |
| 2013/0275880 A1* | 10/2013 | Bachman | G06F 16/40 |
| | | | 715/751 |
| 2013/0347078 A1 | 12/2013 | Agarwal et al. | |
| 2014/0032616 A1 | 1/2014 | Nack | |
| 2014/0047386 A1* | 2/2014 | Lynch | G06F 3/0482 |
| | | | 715/810 |
| 2014/0173393 A1 | 6/2014 | Roy et al. | |
| 2014/0215512 A1 | 7/2014 | Maruyama et al. | |
| 2014/0282076 A1 | 9/2014 | Fischer | |
| 2014/0358962 A1* | 12/2014 | Wantland | G06F 16/90335 |
| | | | 707/769 |
| 2014/0365207 A1 | 12/2014 | Convertino et al. | |
| 2015/0026179 A1* | 1/2015 | Yokoyama | G06F 16/957 |
| | | | 707/737 |
| 2015/0100509 A1* | 4/2015 | Pappas | G06Q 30/02 |
| | | | 707/723 |
| 2015/0116541 A1* | 4/2015 | Gilman | G06F 16/58 |
| | | | 348/231.5 |
| 2015/0212995 A1 | 7/2015 | Massand | |
| 2015/0248387 A1 | 9/2015 | Mattingly | |
| 2015/0356062 A1 | 12/2015 | De Paula et al. | |
| 2016/0066140 A1* | 3/2016 | Gnanasekaran | G06Q 30/0207 |
| | | | 455/456.3 |
| 2016/0099897 A1 | 4/2016 | Kim et al. | |
| 2016/0110472 A1 | 4/2016 | Cheung et al. | |
| 2016/0156584 A1* | 6/2016 | Hum | G06F 3/0482 |
| | | | 715/752 |
| 2016/0162500 A1* | 6/2016 | Wilson | G06Q 30/02 |
| | | | 715/234 |
| 2016/0171092 A1 | 6/2016 | Mueller et al. | |
| 2016/0232144 A1 | 8/2016 | Zhou | |
| 2016/0248733 A1 | 8/2016 | Stutch et al. | |
| 2017/0061528 A1 | 3/2017 | Arora et al. | |
| 2017/0220671 A1 | 8/2017 | Zheng | |
| 2017/0344815 A1 | 11/2017 | Liu et al. | |
| 2018/0032898 A1 | 2/2018 | Wu et al. | |
| 2019/0034441 A1 | 1/2019 | Capon | |
| 2019/0095946 A1 | 3/2019 | Azout et al. | |
| 2019/0246165 A1 | 8/2019 | Brouwer et al. | |
| 2019/0340212 A1 | 11/2019 | Isager | |
| 2020/0117336 A1* | 4/2020 | Mani | F25B 49/005 |
| 2020/0242186 A1 | 7/2020 | Yang et al. | |
| 2020/0301950 A1* | 9/2020 | Lorrain-Hale | G06F 40/117 |
| 2021/0150611 A1 | 5/2021 | Morin et al. | |
| 2021/0240928 A1* | 8/2021 | Sharma | G06F 40/279 |
| 2021/0248247 A1* | 8/2021 | Poothokaran | G06N 3/044 |
| 2021/0326522 A1 | 10/2021 | Sahgal et al. | |
| 2021/0377201 A1* | 12/2021 | D'Agostino | H04L 51/224 |
| 2022/0066599 A1 | 3/2022 | Gupta | |
| 2022/0076009 A1* | 3/2022 | Pande | G06V 30/414 |
| 2022/0222461 A1 | 7/2022 | Mann et al. | |
| 2023/0116149 A1* | 4/2023 | Radhakrishna | G06F 8/33 |
| | | | 717/110 |
| 2023/0122580 A1 | 4/2023 | Gupta | |
| 2023/0336634 A1* | 10/2023 | Hara | G06Q 50/01 |
| 2024/0110806 A1* | 4/2024 | Bahnsen | G01C 21/3617 |

FOREIGN PATENT DOCUMENTS

| | | |
|---|---|---|
| EP | 4303803 | 10/2024 |
| EP | 4404126 | 7/2025 |
| EP | 4567706 | 11/2025 |

OTHER PUBLICATIONS

"European Application Serial No. 21171201.3, Extended European Search Report mailed Sep. 22, 2021", 9 pgs.

"U.S. Appl. No. 17/004,265, Examiner Interview Summary mailed Sep. 28, 2021", 2 pgs.

"U.S. Appl. No. 17/004,265, Final Office Action mailed Nov. 23, 2021", 20 pgs.

"U.S. Appl. No. 17/004,265, Examiner Interview Summary mailed Jan. 20, 2022", 2 pgs.

"U.S. Appl. No. 17/004,265, Advisory Action mailed Feb. 22, 2022", 5 pgs.

"U.S. Appl. No. 17/004,265, Non Final Office Action mailed Apr. 13, 2022", 20 pgs.

"U.S. Appl. No. 17/004,265, Examiner Interview Summary mailed Jul. 22, 2022", 2 pgs.

"U.S. Appl. No. 17/004,265, Notice of Allowance mailed Sep. 16, 2022", 8 pgs.

"European Application Serial No. 21171201.3, Communication Pursuant to Article 94(3) EPC mailed Oct. 5, 2022", 8 pgs.

"U.S. Appl. No. 18/085,390, Non Final Office Action mailed Apr. 24, 2023", 14 pgs.

"U.S. Appl. No. 18/085,390, Notice of Allowance mailed Aug. 21, 2023", 8 pgs.

"European Application Serial No. 23212295.2, Extended European Search Report mailed Jan. 19, 2024", 6 pgs.

"European Application Serial No. 24178784.5, Extended European Search Report mailed Jul. 5, 2024", 6 pgs.

"Chinese Application Serial No. 202110763932.1, Office Action mailed Apr. 9, 2025", w English Translation, 27 pgs.

"European Application Serial No. 25172078.5, Extended European Search Report mailed Jun. 2, 2025", 5 pgs.

"Chinese Application Serial No. 202110763932.1, Decision of Rejection mailed Aug. 4, 2025", With English Machine Translation, 26 pgs.

"Chinese Application Serial No. 202110763932.1, Response Filed Oct. 14, 2025 to Decision of Rejection mailed Aug. 4, 2025", W English Claims, 15 pgs.

* cited by examiner

AUTOMATIC FEEDBACK SYSTEM USING VISUAL INTERACTIONS

CROSS-REFERENCE TO RELATED APPLICATIONS

This application is a continuation of prior U.S. application Ser. No. 18/085,390, filed Dec. 20, 2022, which is a continuation of prior U.S. application Ser. No. 17/004,265, filed on Aug. 27, 2020, each of which is incorporated by reference herein in its entirety.

TECHNICAL FIELD

The subject matter disclosed herein generally relates to machines configured to manage user feedback, and to technologies by which such special-purpose machines become improved compared to other machines that manage user feedback. Specifically, the present disclosure addresses systems and methods that automatically generate feedback for a webpage based on visual interactions on the webpage.

BACKGROUND

Oftentimes, user feedback from a user is provided in a wrong location or the feedback is not supported by a review platform. For example, the user may provide feedback for an item or a merchant in a location that is configured for providing feedback for operations of a website. Additionally, the user may need to access different forms to provide different feedback types such as an item review form, a website operations form, a sale-not-as-described claim form, and so forth.

BRIEF DESCRIPTION OF DRAWINGS

Various ones of the appended drawings merely illustrate example embodiments of the present invention and cannot be considered as limiting its scope.

FIG. 3 is an example screenshot of a webpage, according to some example embodiments.

FIG. 4 is an example screenshot of the webpage illustrating various user input provided via visual interactions with the webpage, according to one example.

FIG. 5 is an example screenshot of a next section of the webpage illustrating various user input provided via visual interactions, according to one example.

FIG. 6 is an example screenshot of the webpage illustrating a feedback preview, according to one example.

DETAILED DESCRIPTION

Figure 1:
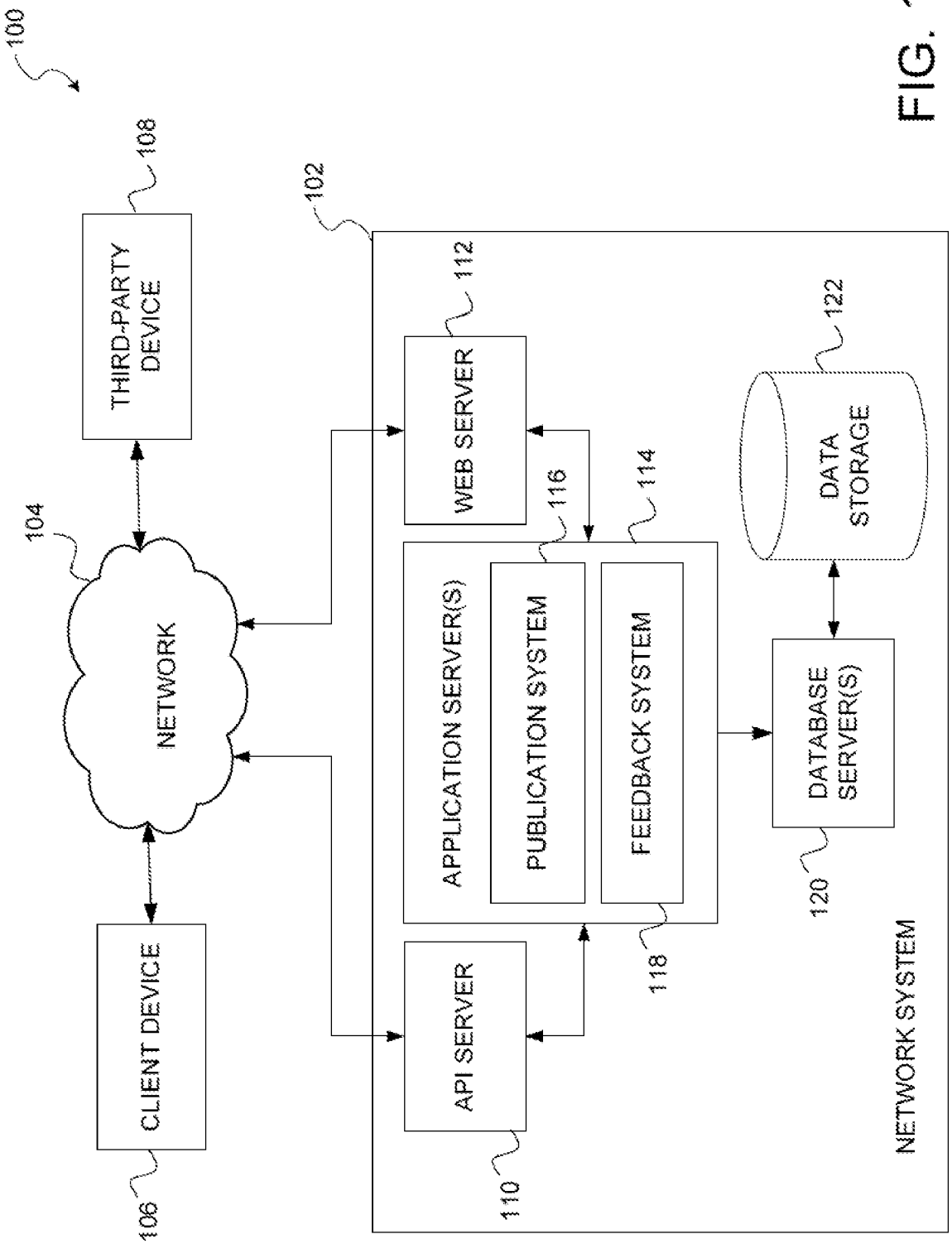
FIG. 1 is a diagram illustrating a network environment suitable for providing an automatic feedback system that uses visual interactions, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Typically, a user may have a bad experience while interacting with a website and wants to provide feedback either with the website or on a review website. However, the bad experience can be related to many different issues such as bad service or user experience, item different from item description, user interface or technical issues, a merchant issue, quality of an item, warranty issues, or any combination of these or other issues. In some cases, the user is unsure where to provide the feedback or provides it in a wrong location. In other cases, the feedback is about something not supported by a platform of the system. Further still, the feedback may be provided correctly (e.g., in a correct location) but is not detailed enough. In some cases, a reviewer may not have the necessary tools to provide proper feedback. For instance, the reviewer is provided a textbox to provide comments, but the reviewer wants to reorganize components on the webpage, indicate components that are difficult to read, indicate visual changes to a component, and so forth. As a result, these feedbacks are not actionable by the system.

Example embodiments provide systems and methods that generate feedback from visual interactions on a webpage and distributes the feedback, sometimes with appropriate tags, to a proper entity. Accordingly, the system configures a webpage to receive user inputs in the form of visual interactions with components displayed on the webpage. For example, a user can select a component (e.g., image, text) on the webpage and make edits directly to the component or provide comments about the selected component. Additionally, a component can also be dragged and dropped to a different location on the webpage. The user inputs are received by the system and processed. Processing can include determining, based on (an identification of) the webpage and a location (e.g., coordinates) of the user input, a feedback type for each user input. For example, the feedback type may include site feedback, seller feedback, and item feedback. The user inputs can be organized based on the feedback type. A feedback preview that displays each of the user inputs can be organized based on feedback type and presented to the user. The user can then approve some or all of the feedback on the feedback preview, which causes the approved feedback to be transmitted to a corresponding entity associated with the feedback type.

Accordingly, the present disclosure provides, in one embodiment, a technical solution to the technical problem of generating and transmitting feedback to a proper entity that can act on the feedback. The generated feedback can be obtained in a single location (e.g., on the webpage) that provides a user-friendly context. This removes the need for a reviewer to navigate a website to find a proper form or location to submit feedback for different types of issues or context. As a result, resources used by one or more machines, databases, or devices (e.g., within an environment) may be reduced for such search systems. Examples of such computing resources include processor cycles, network traffic, memory usage, data storage capacity, power consumption, network bandwidth, and cooling capacity.

With reference to FIG. 1, an example embodiment of a network environment 100 that provides a system for generating and providing user feedback based on visual interactions performed on a webpage is shown. A network system 102 provides server-side functionality via a communication network 104 (e.g., the Internet, wireless network, cellular network, or a Wide Area Network (WAN)) to a client device 106 and a third-party device 108.

In example embodiments, the client device 106 is a device of a user that desires to provide a review or feedback (also referred to herein as the "reviewer") for a webpage that is associated with the network system 102 (e.g., managed or hosted by the network system 102). The third-party device 108 may be a device associated with an entity that receives feedback provided by the reviewer. For example, the third-party device 108 may be associated with a seller, a store, or other entity that publishes information on the website that can be reviewed by the reviewer.

The client device 106 and the third-party device 108 interface with the network system 102 via a connection with the network 104. Depending on the form of the client device 106 and the third-party device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth or fifth generation wireless, 4G or 5G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with the client device 106 and the third-party device 108 executing a web client (e.g., an Internet browser), which may be in communication with the network system 102. The UIs may also be associated with one or more applications (e.g., an application provided by or through the network system 102).

The client device 106 and the third-party device 108 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the client device 106 and the third-party device 108 comprise a display module (not shown) to display information (e.g., in the form of user interfaces). In further embodiments, the client device 106 and the third-party device 108 comprise one or more of a touch screen, accelerometer, camera, microphone, and Global Positioning System (GPS) device.

The client device 106 and the third-party device 108 may include one or more applications (also referred to as "apps") such as, but not limited to, a web browser, messaging application, electronic mail (email) application, a network system application (associated with the network system 102), third-party applications, and the like. In some embodiments, if a site application (e.g., the network system application) is included in the client device 106 and the third-party device 108, then this application is configured to locally provide the user interface and at least some of the functionalities with the application configured to communicate with the network system 102, on an as needed basis, for data or processing capabilities not locally available (e.g., to publish publications, access a database of published publications, to authenticate a user, to provide communications with other users of the network system 102). Conversely if the site application is not included in the client device 106 and the third-party device 108, the client device 106 and the third-party device 108 may use its web browser to access a website (or a variant thereof) hosted on the network system 102.

Turning specifically to the network system 102, an application program interface (API) server 110 and a web server 112 are coupled to, and provide programmatic and web interfaces respectively to, one or more application servers 114. The application servers 114 host a publication system 116 and a feedback system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or data storage 122. In one embodiment, the data storage 122 is a device that stores content (e.g., publications or listings, user profiles including past feedback provided by the user) that is used by the network system 102.

In example embodiments, the publication system 116 publishes content on a network (e.g., Internet) in the form of webpages. As such, the publication system 116 provides a number of publication functions and services to users (e.g., a user of the third-party device 108) that publish content via the network system 102. For example, the publication system 116 can host a marketplace application that provides a number of functions and services to users, such as publishing listing whereby a user (e.g., a seller) may list (or publish information concerning) goods or services (also referred to as "items") for sale, a potential user or buyer can express interest in or indicate a desire to purchase such goods or services, and a transaction pertaining to the goods or services is processed. However, it is noted that the publication system 116 may, in alternative embodiments, be associated with a non-marketplace environment such as an informational environment (e.g., search engine) or social networking environment that publishes articles, reviews, or other types of information.

The feedback system 118 comprises one or more components (e.g., servers) that manage generation and provisioning of user feedback based on visual interactions performed by reviewers on webpages. The feedback system 118 will be discussed in more detail in connection with FIG. 2 below.

While the publication system 116 and the feedback system 118 are shown in FIG. 1 to form part of the network system 102, it will be appreciated that, in alternative embodiments, the publication system 116 or the feedback system 118 may form part of a separate service that is distinct from the network system 102. Further still, one or more components of the feedback system 118 may, alternatively, be located within the publication system 116 or vice-versa. Furthermore, while the client-server-based network environment 100 shown in FIG. 1 employs a client-server architecture, the present inventive subject matter is of course not limited to such an architecture and could equally well find application in a distributed or peer-to-peer architecture system, for example. The publication system 116 and feedback system 118 can also be implemented as standalone software programs, which do not necessarily have networking capabilities.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of network systems 102, networks 104, client devices 106, and third-party devices 108 may be embodied within the network environment 100. Furthermore, some components or functions of the network environment 100 may be combined or located elsewhere in the network environment 100.

Figure 2:
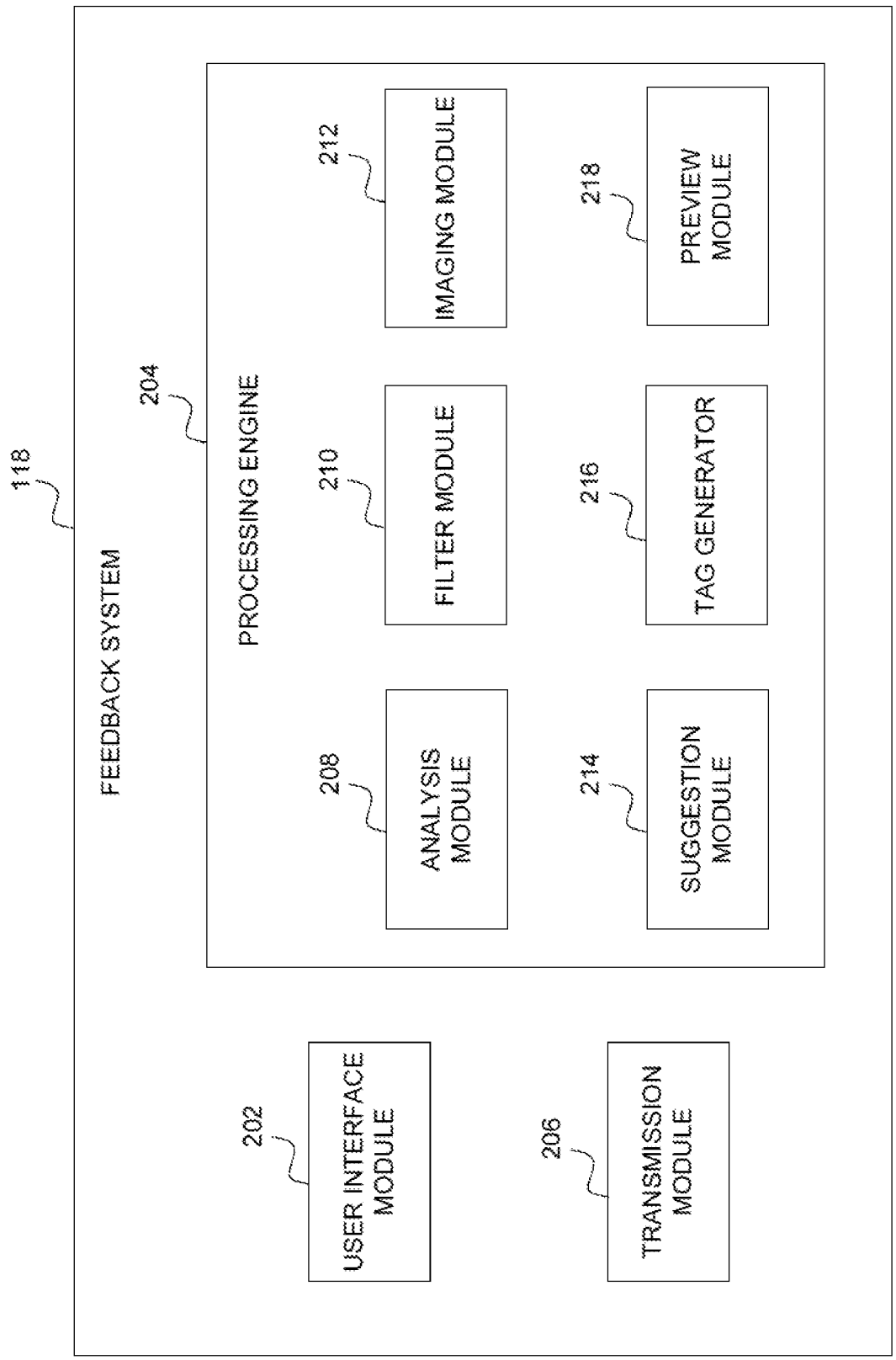
FIG. 2 is a block diagram illustrating components of a feedback system, according to some example embodiments.

FIG. 2 is a block diagram illustrating components of the feedback system 118, according to some example embodiments. In example embodiments, the feedback system 118 comprises one or more servers that include components that manage generation of feedback based on visual interactions performed by reviewers on webpages. To enable these operations, the feedback system 118 comprises a user interface (UI) module 202, a processing engine 204, and a transmission module 206.

The UI module 202 manages the user interactions received on the webpages that are presented via the publication system 116. In various embodiments, the UI module 202 receives an indication of a selection of an edit trigger that is shown on a webpage on which a reviewer wants to provide feedback. In response to receiving the indication, the UI module 202 configures the webpage to receive the feedback from the reviewer. Configuring the webpage to receive the feedback can include, for example, enabling the UI presenting the webpage to receive and display visual interactions or inputs applied directly to the webpage. For instance, the reviewer can move (e.g., drag and drop) a component (e.g., an image, text) from one location on the webpage to another. In other example, the reviewer can free-hand draw on an image of an item and provide a comment (e.g., in a comment box located proximate to the free-hand drawing) regarding the free-hand drawing. Further still, the user can highlight text displayed on the webpage and provide a comment (e.g., in a comment box located proximate to the highlighted text) directed to the highlighted text or otherwise edit text originally displayed on the webpage. Alternatively, the user input may simply be highlight text displayed on the webpage.

In example, embodiments, the UI module 202 determines and associates various data with each user input provided on the webpage. When a user provides a user input (e.g., user input is received by the UI module 202), the UI module 202 determines an identifier of the webpage and coordinates of a location of the user input within the webpage. The identifier and coordinates are associated with or linked to an edit (i.e., the user input) that indicates the feedback. The user input along with the identifier and coordinates are provided to the processing engine 204 for processing as discussed in more detail below.

The processing engine 204 is configured to analyze each user input, determine feedback types and feedback suggestions, and generate tags and feedback previews. To enable these operations, the processing engine 204 includes an analysis module 208, a filter module 210, an imaging module 212, a suggestion module 214, a tag generator 216, and a preview module 218.

The analysis module 208 analyzes each user input to understand the feedback and feedback type. The analysis can occur in real-time as the user is providing their inputs or immediately after the user completes entering a user input. In example embodiments, the analysis module 208 can determine, for example, if a user input is site feedback (e.g., to be directed to an administrator of the website), user feedback related to a publication or a transaction (e.g., to be directed to a seller or publisher of content on the website), item feedback, payment feedback (e.g., to be directed to a payment entity), or other type of feedback that will be directed to a corresponding entity that can act on the feedback. The analysis module 208 makes the determination based on where the user input is located on the webpage (e.g., based on the coordinates). In example embodiments, the analysis module 208 accesses a database that stores information for webpages including a corresponding identifier and components shown on each webpage along with coordinates of the components (e.g., images, text). Based on the component that corresponds to the location of the user input, the analysis module 208 can identify the feedback type. In one example, the database will indicate the corresponding feedback type for the component.

The analysis module 208 also determines the actual feedback that should be provided to the various entities based on analysis of the content of the user input. For example, the analysis module 208 uses various natural language processing (NLP) algorithms to understand the user input and form the feedback. For example, a reviewer may indicate an appropriate price by simply replacing a previous price with a suggested price. The analysis module 208 determines the actual feedback that will be provided to the reviewee, which may be, for example, "User thinks a better price is $150." In another example, a user can provide a comment in a different language and the analysis module 208 understands the language and generates the feedback. For instance, if the user provides in French, "Cette couleur est géniale," the analysis module 208 understands this means "this color is awesome" and generates that feedback.

Even a user input that appears irrelevant can have meaning associated with it. For example, if the user input is "I am tired of the Covid-19 lockdown" and the user did not make a purchase, it is possible that the purchase did not occur because of job issues. As a result, the analysis module 208 may generate feedback that indicates "User is tired of covid-19 lockdown, might want to adjust listing to help" to a seller who may want to reduce the price of the item.

The feedback is not limited to text generation. If feedback requires discreet values, like ratings in the form of "positive," "neutral," or "negative," those values can also be auto-generated by processing the user input by the analysis module 208.

The filtering module 210 is configured to filter user input that is irrelevant. In example embodiments, the filtering module 210 applies machine learning (e.g., runs the user input through a machine learning engine) to filter out user inputs that do not make sense. For example, the user provides an input "Hello" instead of "Shipping and packaging were great" in a section for shipping or inputs " " (empty). These user inputs are irrelevant for generating the feedback resulting in the filtering module 210 filtering out these user inputs.

Further still, the filtering module 210, in some embodiments, detects that two or more user inputs on a webpage are correlated. In these cases, the filtering module 210 can combine the correlated user input to provide improved feedback. For instance, the user may provide "very sleek" for a highlighted image as well as in an item description section, thus providing the same user input twice. The filtering module 210 detects the correlation between these two user inputs and can generate "better" input by removing unnecessary text or consolidating the feedback. In another example, if a shape of an item in an image is described as "this is not heavy" and elsewhere the user inputs "this is sleek and lightweight," the filtering module 210 may filter "not heavy" since it is the same as "lightweight." In some cases, the filtering module 210 works with the analysis module 208 (e.g., for natural language processing) in performing the filtering. Alternatively, the correlation and improved feedback may be performed by the analysis module 208.

The imaging module 212 is configured to analyze user inputs that involve an image. For example, a reviewer may draw a circle around an item depicted in an image and provide a comment. In another example, the reviewer may make a correction or adjustment to the item depicted in the image (e.g., using photoshop-like tools). In these cases, the imaging module 212 performs an image lookup based on the free-hand drawings to identify a similar item to the item in the image or to otherwise identify the item. Information associated with the (similar) item (e.g., image, details) may be retrieved or accessed and included in generating the feedback. In various embodiments, the imaging module 212 works with the analysis module 208 or is a part of the analysis module 208.

The suggestion module 214 is configured to provide feedback suggestion(s) to the reviewer. In some embodiments, the suggestion module 214 works with the analysis module 208 to provide the suggestion(s). The suggestion(s) can be provided in real-time as the reviewer is providing their input. For example, the reviewer selects an image or text on the webpage and starts to enter comments. While the reviewer enters the comments or shortly thereafter, the analysis module 208 detects the location of the user input. The suggestion module 214 then determines or generates suggestions that are presented to the reviewer. The suggestions may be determined on-the-fly by the suggestion module 214 based on data known or accessible by the suggestion module 214. For example, the suggestions can be based on transaction data (e.g., known or accessed from a user profile of the reviewer). Further still, the suggestion module 214 may access suggestions from data sources. For example, one data source may be based on machine learning of how other reviewers have reacted to the same location on the webpage (e.g., other feedback provided from other reviewers for the same location). The suggestion module 214 can also suggest pre-defined phrases or even tags (e.g., from a data source) to help the reviewer provide feedback. The reviewer can select one or more suggestions to include in their feedback.

The tag generator 216 is configured to generate tags from the user feedback that indicate a descriptive aspect from the feedback. The tags can be used, for example, to highlight reviews in subsequent webpages. For example, the tag generator 216 can take feedback such as "Color was awesome" or "Shipping and packaging were great" and create the tags. In various embodiments, the tags can be detailed and be any length.

The preview module 218 generates a feedback preview that is presented to the user for review. The feedback preview organizes the user inputs by feedback types. In order to generate the feedback preview, the preview module 218 accesses the user inputs and feedback types determined by the analysis module 208 and generates a display component that summarizes the user inputs (subject to any that are filtered out by the filter module 210). The display component can be a pop-up interface or panel that is shown overlaid over the webpage or be a panel displayed on a side of the UI presenting the webpage. In one embodiment, the feedback preview can be presented on a side of the UI as the reviewer is providing their inputs (i.e., in real-time or substantially real-time). In this embodiment, the reviewer can see the analyzed feedback (from the analysis module 208) and adjust/change it. In an alternative embodiment, the feedback preview can be presented to the reviewer when the reviewer has completed entering their inputs. Further still, the feedback preview can be displayed whenever the reviewer activates a preview icon or trigger.

In example embodiments, the reviewer reviews the feedback preview and can approve one or more (or all) feedback shown on the feedback preview. In one embodiment, the feedback preview may include a submit or approve icon for submitting all of the feedbacks. Alternatively, or in addition, the feedback preview can have a submit/approval icon associated with each feedback type or with each individual user input. Here, the reviewer can selectively submit their feedback. For example, the submit/approval icon can be a button labelled "create feedbacks," "create site feedback,"

"create feedback for seller," "generate all feedback and submit," and so forth. The reviewer can also edit their inputs.

In response to receiving an indication of a selection of one or more submit/approval icons, the transmission module 206 transmits feedback(s) corresponding to the selected submit/approval icon to a corresponding entity. For example, the feedback preview can present site feedback, user feedback, item feedback, payment feedback, and so forth. As such, approved site feedback can be transmitted to an administrator of the website, while approved user feedback related to a publication or an item is transmitted to a seller or publisher of content on the website, and approved payment feedback is transmitted to a payment service.

While the feedback system 118 is illustrated as having certain components in FIG. 2, the feedback system 118 may also comprise other components (not shown) that are not pertinent to example embodiments. Furthermore, any one or more of the components (e.g., engines, modules, generators) described herein may be implemented using hardware (e.g., a processor of a machine) or a combination of hardware and software. Moreover, any two or more of these components may be combined into a single component, and the functions described herein for a single component may be subdivided among multiple components.

Figure 3:
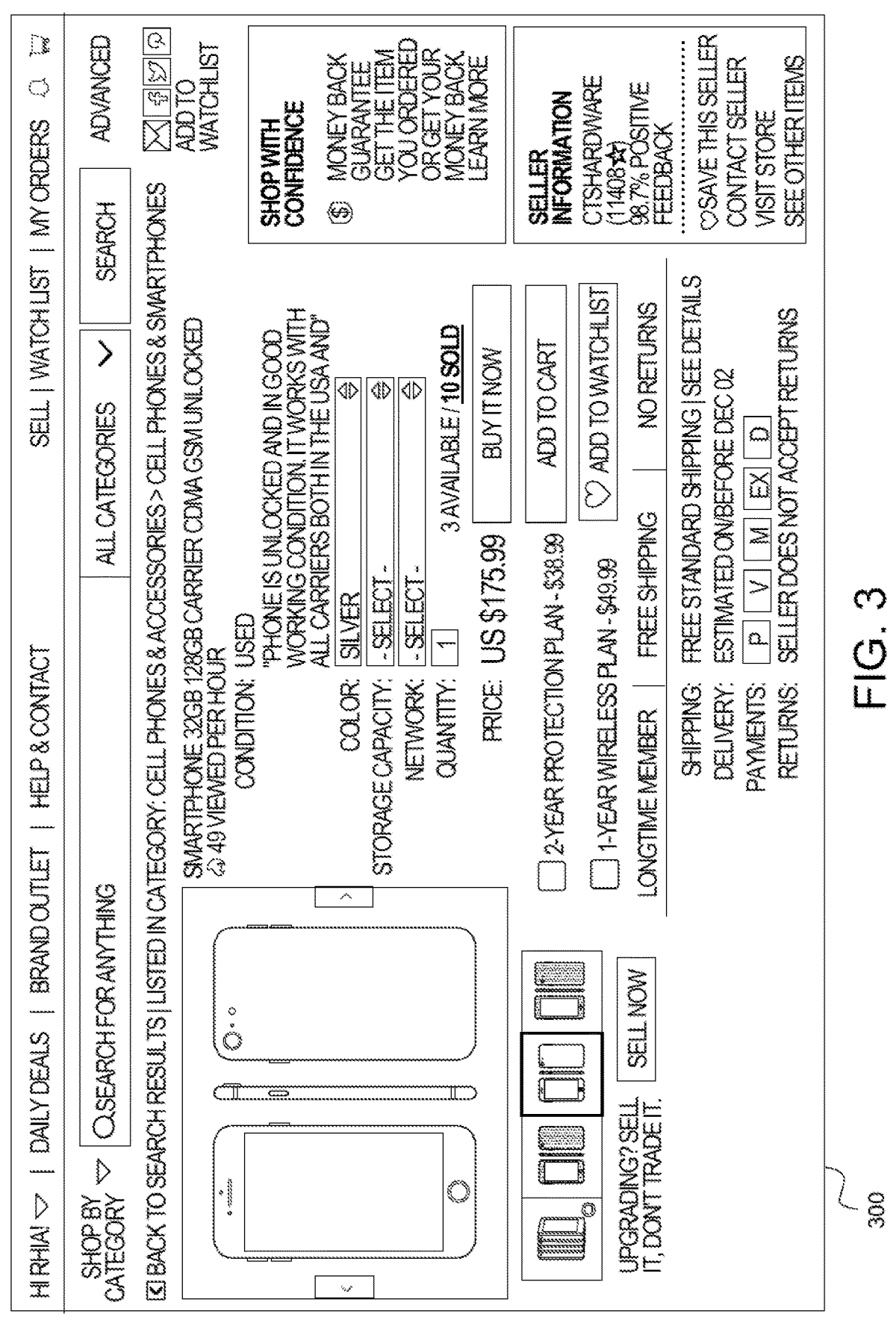

FIG. 3 is a screenshot of a webpage 300, according to one example. The webpage 300 is displayed on a user interface (UI) and comprises content published by a publisher (e.g., content provider, seller, store). A user or potential reviewer can view the webpage 300 and decide to provide feedback. The user can trigger an edit mode by making a selection of an edit trigger that is displayed on the UI or otherwise associated with the UI. For example, right clicking on the UI may present a selectable trigger icon or option. Upon the user selecting the edit trigger, the feedback system 118 (e.g., the user interface module 202) configures the webpage 300 to receive user inputs.

Figure 4:
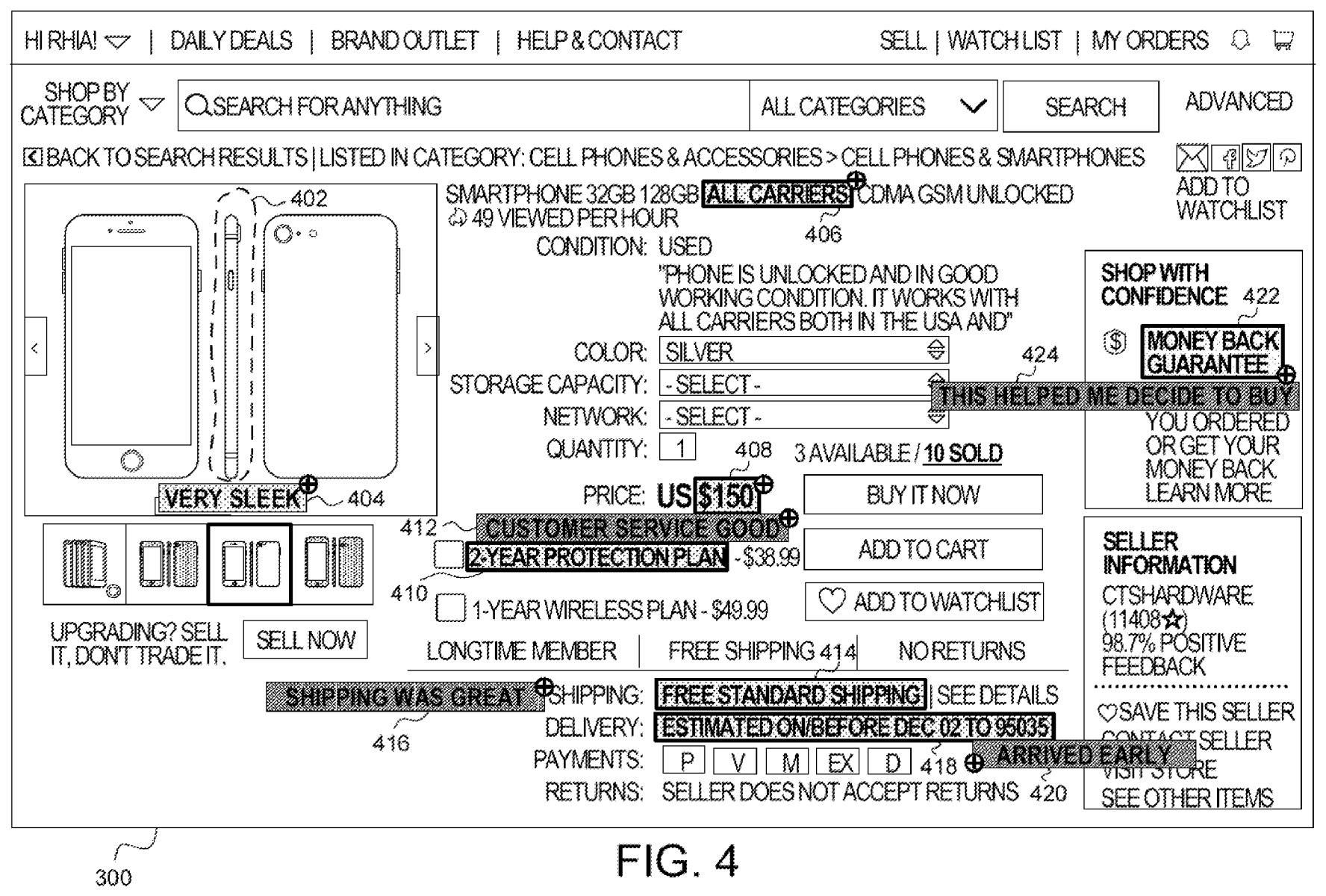

FIG. 4 is an example screenshot of the webpage 300 illustrating various user inputs provided via visual interactions with the webpage 300, according to one example. The visual interactions include a free-hand drawing 402 (shown in a dashed line) around an image (e.g., of a side of a phone) and a comment in a comment box 404 indicating that the reviewer thought the phone is sleek. In other examples, the user can also edit a photo or image of an item. A "+" icon show adjacent to the comment box 404 can be selected to indicate that the reviewer is done inputting their comment (e.g., to submit the comment).

A second and third visual interaction includes a user change to text in the original website 300. The reviewer can highlight a portion of the text that the reviewer wants to change and makes the changes directly to the text. Here, the reviewer highlighted text in a title and indicated that the title should be changed to reflect "all carriers" (i.e., user input 406). The reviewer also highlighted and change a price (i.e., user input 408) to indicate that $150 is a more appropriate price for this item.

Further visual interactions include feedback on different aspects of related services associated with the item being sold on the website. The reviewer can highlight the component or element that the reviewer wants to provide the feedback on and provide a comment in a corresponding comment box. For example, the reviewer highlights a service plan component 410 and indicated that customer service is good in a corresponding comment box 412. In another example, the reviewer highlights a free standard shipping component 414 and indicated that shipping was great in a corresponding comment box 416. The reviewer also highlighted an estimated delivery component 418 and indicated that the item arrived early in a corresponding comment box 420. Finally, the reviewer highlighted a money back guarantee component 422 and indicated that having the money back guarantee helped them decide to purchase the item in comment box 424.

It should be noted that a "+" icon can be shown adjacent to any user input in order for the reviewer to indicate that the reviewer is done providing their input for that component or element on the webpage 300. Additionally, any number of user inputs may be provided on the webpage 300

Figure 5:
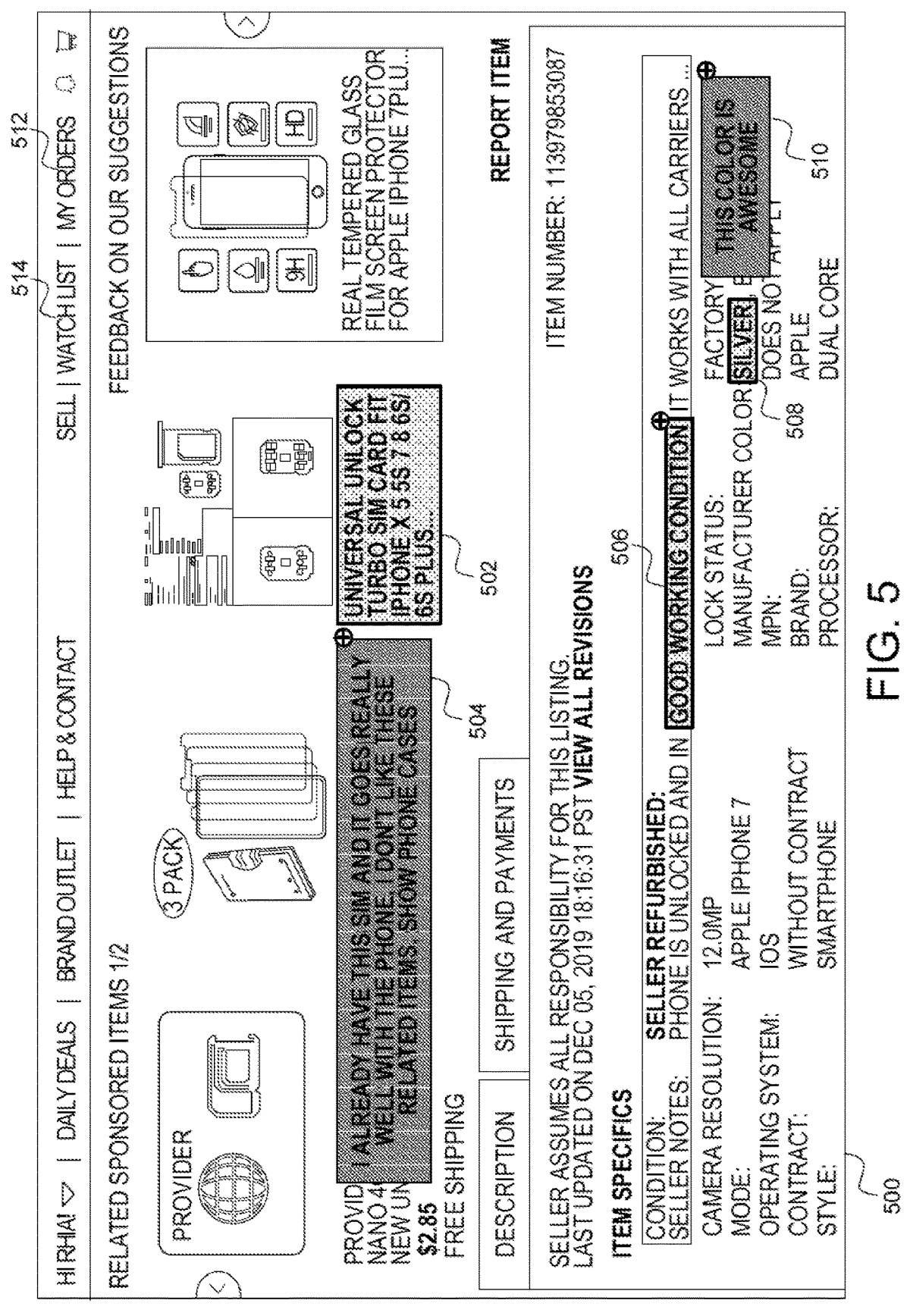

The reviewer can proceed to a next page or section of the webpage 300 to continue providing feedback. FIG. 5 is an example screenshot of a next section 500 of the webpage 300 illustrating further user inputs provided via visual interactions, according to one example. In a related items portion of the next section 500, the reviewer highlights an item that the reviewer has previously purchased (i.e., component 502) and provides user input indicating that he purchased the item previously, that he does not like the recommended items, and that phone cases should be shown instead (i.e., user input 504). This feedback is valuable feedback for the publication system 116 which uses machine learning on top of such feedback to recommend items to users.

The reviewer can also indicate text that should be used to generate feedback simply by highlighting the text and submitting it. For example, the reviewer has highlighted "good working condition" and can select the "+" icon to generate feedback from the highlight text (i.e., user input 506). Finally, the reviewer has highlighted "silver" text 508 and indicated that the color is awesome in comment box 510.

Though not illustrated, the reviewer can also select a component and move it to a different location on the webpage. For example, the reviewer can select a "my orders" component 512 and move it before a "watchlist" component 514.

Figure 6:
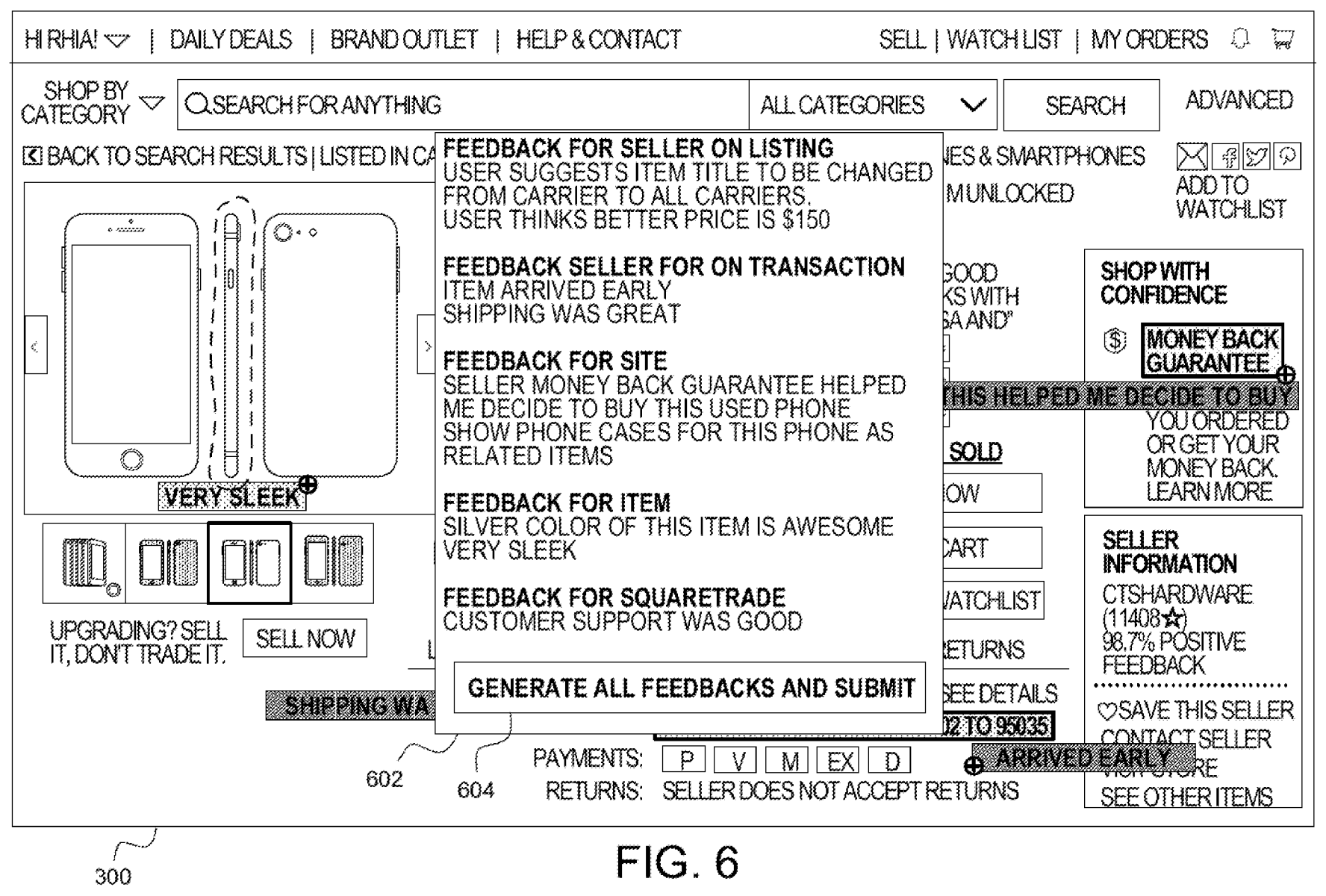

FIG. 6 is an example screenshot of the webpage 300 illustrating a feedback preview 602, according to one example. The feedback preview 602 organizes the various user inputs by feedback type. In the example of FIG. 6, the feedback types include feedback for seller on listing, feedback for seller on transaction, feedback for site, feedback for item, and feedback for a warranty provider. In some cases, the user input is formatted into natural language. For example, the reviewer indicated an appropriate price in FIG. 4 by simply replacing the previous price with a suggested price. The analysis module 208 determines the actual feedback, which is that "User thinks better price to be set is $150."

In the present example, a single approval/submit icon 604 is presented at a bottom of the feedback preview 602. Selection of the approval/submit icon 604 automatically submits all the given feedback which causes the transmission module 206 to forward the feedback to the appropriate corresponding entity (e.g., the seller, the site, the warranty provider). In an alternative embodiment, an approval/submission icon can be associated with each feedback type or each user input. This allows the reviewer to submit feedback for less than all feedback types.

While not shown, the feedback preview 602, in alternative embodiments, may also be enabled to allow the reviewer to edit the feedback. For example, the reviewer can change "silver" to "black" under the "feedback for item" feedback type. In another example, the reviewer can delete a portion of the feedback prior to submission.

Figure 7:
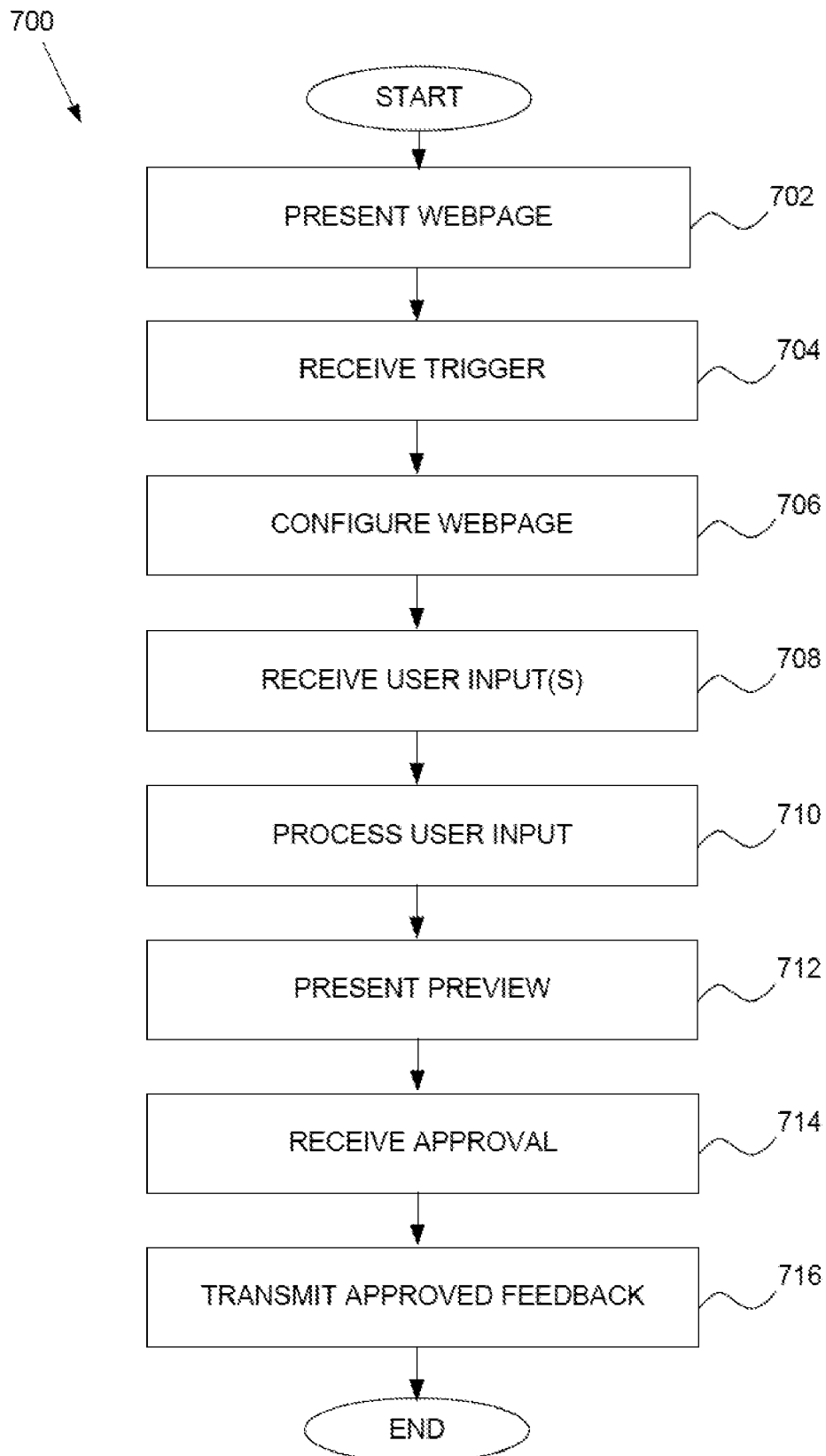
FIG. 7 is a flowchart of a method for generating and providing user feedback based on visual interactions performed on a webpage, according to one example.

FIG. 7 is a flowchart of a method for generating and providing user feedback based on visual interactions performed on a webpage, according to some example embodiments. Operations in the method 700 may be performed by the network system 102 using components described above with respect to FIG. 1. Accordingly, the method 700 is described by way of example with reference to the network system 102. However, it shall be appreciated that at least some of the operations of the method 700 may be deployed on various other hardware configurations or be performed by similar components residing elsewhere in the network environment 100. Therefore, the method 700 is not intended to be limited to the network system 102.

In operation 702, a webpage is presented to a user (e.g., a potential reviewer). In some embodiments, the publication system 116 publishes content on a network in the form of webpages.

In operation 704, the UI module 202 receives an indication of a selection of an edit trigger that is shown on a webpage on which the reviewer wants to provide feedback. In one embodiment, the reviewer right clicks and selects an option to provide feedback. In an alternative embodiment, an edit icon is displayed on a portion of the webpage.

In response to receiving the indication, the UI module 202 configures the webpage to receive the feedback from the reviewer in operation 706. Configuring the webpage to receive the feedback can include, for example, enabling the UI presenting the webpage to receive and display visual interactions or inputs applied directly to the webpage. Additionally, image editing tools may be provided or accessible to the reviewer.

In operation 708, the UI module 202 receives one or more user inputs. For instance, the reviewer can move (e.g., drag and drop) a component (e.g., an image, text) from one location on the webpage to another to indicate a viewing or ranking preference. In other example, the reviewer can free-hand draw on the webpage (e.g., on an image of an item) and can provide a comment in a comment box located proximate to the free-hand drawing regarding the free-hand drawing. Further still, the user can highlight text displayed on the webpage and provide a comment (e.g., in a comment box located proximate to the highlighted text) directed to the highlighted text or otherwise directly edit text originally displayed on the webpage.

In example embodiments, the UI module 202 determines and associates various data with each user input provided on the webpage. More specifically, the UI module 202 determines an identifier of the webpage and coordinates of a location of each of the user inputs within the webpage. The identifier and coordinates are associated with or linked to an edit (i.e., the user input) that indicates the feedback.

In operation 710, the processing engine 204 processes the one or more user inputs. Operation 710 will be discussed in more detail in connection with FIG. 8 below.

In operation 712, the results of the processing are presented in a feedback preview by the preview module 218. In one embodiment, the feedback preview can be presented on a side of the UI as the reviewer is providing their inputs (i.e., in real-time or substantially real-time). In an alternative embodiment, the feedback preview can be presented to the reviewer when the reviewer has completed entering their inputs (e.g., after each completed user input or after all user inputs completed). Further still, the feedback preview can be displayed whenever the reviewer selects a preview icon or trigger displayed on the UI.

In operation 714, approval of one or more feedback (e.g., analyzed user inputs) in the feedback preview is received by the feedback system 118 (e.g., the preview module 218 or transmission module 206). In example embodiments, the reviewer reviews the feedback preview and can approve one or more (or all) feedbacks shown on the feedback preview. In one embodiment, the feedback preview may include a submit/approve icon for submitting all of the feedbacks. Alternatively, or in addition, the feedback preview can have a submit/approval icon associated with each feedback type or with each feedback (e.g., analyzed user input).

In operation 716, the transmission module 206 transmits approved feedback to a corresponding entity. For example, approved site feedback can be transmitted to an administrator or host of the website, while approved user feedback related to a publication or an item is transmitted to a seller or publisher of content on the website.

The method 700 is exemplary and alternative embodiments may make some of the operations optional or remove some of the operations of the method 700. For instance, the presenting of the preview (operation 712) and receiving approval (operation 714) may be optional or removed from the method 700. In these embodiments, the processing engine 204 processes the one or more user inputs (operation 710) and the transmission module 206 transmits the feedback to the corresponding entity (operation 716) without user approval being required. Further still, in another alternative embodiment, the feedback may be provided to the corresponding entity as the user is providing the user input or as soon as each user input is received.

Figure 8:
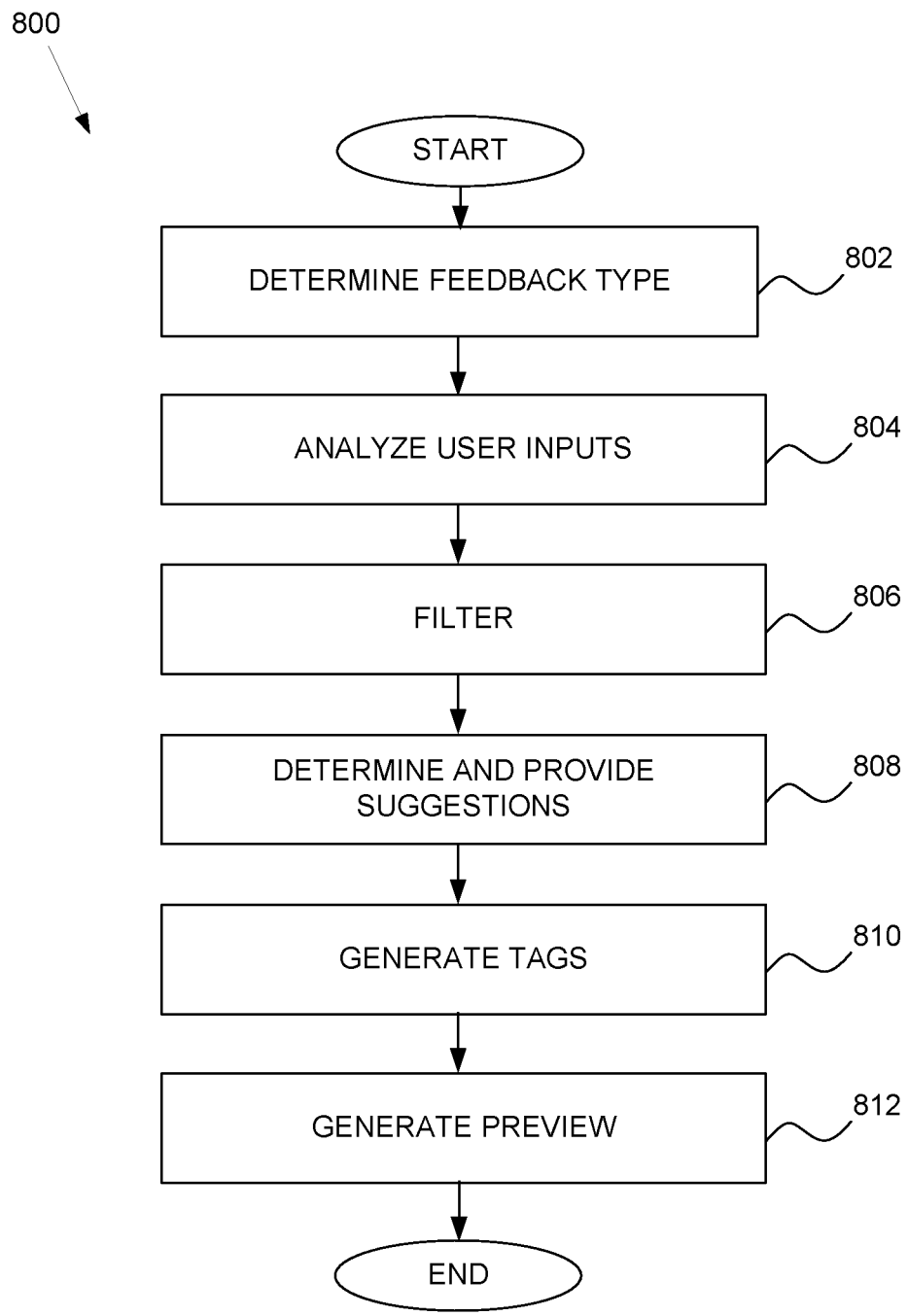
FIG. 8 is a flowchart of a method for processing feedback, according to some example embodiments.

FIG. 8 is a flowchart of a method 800 for processing user inputs (e.g., operation 710), according to some example embodiments. Operations in the method 800 may be performed by the feedback system 118 using components described above with respect to FIG. 2. Accordingly, the method 800 is described by way of example with reference to the feedback system 118. However, it shall be appreciated that at least some of the operations of the method 800 may be deployed on various other hardware configurations or be performed by similar components residing elsewhere in the network environment 100. Therefore, the method 800 is not intended to be limited to the feedback system 118.

In operation 802, the analysis module 208 determines a feedback type for each user input. For example, the analysis module 208 can determine if a user input is site feedback (e.g., to be directed to an administrator of the website), user feedback related to a publication or a transaction (e.g., to be directed to a seller or publisher of content on the website), item feedback (e.g., to be directed to a seller or publisher of content on the website), payment feedback (e.g., to be directed to a payment system), warranty feedback (e.g., to be directed to a warranty provider), location feedback, service feedback, or other forms of feedback depending on the webpage and type of business being reviewed by the reviewer. The analysis module 208 makes the determination based on where the user input is located on the webpage (e.g., based on the coordinates). In example embodiments, the analysis module 208 accesses a database that includes information for webpages including a corresponding identifier (to identify the specific webpage) and components shown on each webpage along with coordinates of these components. Based on the component that corresponds to the location of the user input, the analysis module 208 can identify the feedback type. In some embodiments, a feedback type can be associated with each component (e.g., in the database).

In operation 804, the analysis module 208 analyzes the one or more user inputs to understand the feedback. That is, the analysis module 208 determines the actual feedback that should be provided to the various entities based on analysis of the content of the user input. In some embodiments, the analysis module 208 uses various natural language processing (NLP) algorithms or machine learning to understand the user input and form the actual feedback that will be provided to the corresponding entity. For instance, a change to text in a title of a publication (e.g., changing "Sprint" to "all carriers") can be formulated into feedback that indicates that the reviewer believes the new text is more appropriate (e.g., "user suggest item title be change from Sprint to all carriers").

Operation 804 may also include analyzing user inputs that involve an image. For example, a reviewer may draw a circle around an item depicted in an image and provide a comment regarding the circled item. In another example, the reviewer can make a correction or adjustment to the item depicted in the image (e.g., using image editing tools). In these cases, the imaging module 212 can perform an image lookup based on the free-hand drawings to identify a similar item to the item in the image or to identify the item. Information associated with the similar item or identified item (e.g., image, details, description) may be included in the feedback (e.g., analyzed user input).

In operation 806, the filter module 210 filters the user input(s). In example embodiments, the filtering module 210 applies machine learning (e.g., runs the user input through a machine learning engine) to filter out user inputs that do not make sense. For example, the user may highlight a component with text indicating a delivery option and provides a comment that the price of the item is too high. Because the comment does not appear to be directed to the highlighted text, the filter module 210 will remove (or otherwise not include) this user input in generating the feedback or feedback preview.

In operation 808, the suggestion module 214 determines and provides suggestions for user inputs. In various embodiments, the suggestion module 214 works with the analysis module 208 to provide the suggestions. In some embodiments, the suggestions can be provided in real-time as the reviewer is providing their input. For example, the reviewer selects an image or text on the webpage and starts to enter comments. While the reviewer is entering the comments or shortly thereafter, the UI module 202 detects the location of the user input and the analysis module 208 determines the component from the location. The suggestion module 214 can then generate suggestions (e.g., on-the-fly) for the same or similar component or search a database or data source of suggested feedback or previous feedback provided for that component or similar component. The suggestions can be based on transaction data (e.g., known or accessed from a user profile of the reviewer) or based on machine learning of how other reviewers have reacted to the same location on the webpage (e.g., other feedback provided from other reviewers for the same location). The suggestion module 214 can also suggest pre-defined phrases or even tags to help with the reviewer provide their feedback. The reviewer can select one or more suggestions to include in their feedback. Selected suggestions are received as part of a user input or as an additional user input by the feedback system 118.

In operation 810, the tag generator 216 generates tags from the user feedback that indicate a descriptive aspect from the feedback. The tags can be used, for example, as keywords or phrases that highlight aspects of the item or content in subsequent webpages displayed for the same (or similar) item or content. The tags can also be suggestions provided to future reviewers. In some embodiments, the tags may be generated after the transmission module 206 transmits the approved feedback to the corresponding entity in operation 716.

In operation 812, the preview module 218 generates the feedback preview that is presented to the user. The feedback preview organizes the user inputs analyzed in operation 804 by the feedback types determined in operation 802, and generates a display component that summarizes the user inputs (subject to any that are filtered out in operation 806). The display component can be a pop-up interface that is shown overlaid over the webpage or be displayed on a side of the UI presenting the webpage. In one embodiment, the feedback preview can be presented on a side of the UI as the reviewer is providing their inputs (i.e., in real-time or substantially real-time). In an alternative embodiment, the feedback preview can be presented to the reviewer when the reviewer has completed entering their inputs. Further still, the feedback preview can be displayed whenever the reviewer selects a preview icon or trigger.

The method 800 of FIG. 8 provides one embodiment for processing user inputs. Alternative embodiments may not include all the operations of the method 800 or perform the operations of the method 800 in a different order.

While example embodiments have been discussed with examples directed to webpages that display items for sale, alternative embodiments may cover reviews provided in other environments. That is, the reviewer can provide user inputs on a webpage of any content provider so long as the content provider (or an entity hosting the website that displays the webpage) has (or has access to) components or functionalities of the feedback system 118. Additionally, the reviewer can review multiple, different webpages and submit all or a portion of the feedbacks after reviewing a single feedback preview.

Figure 9:
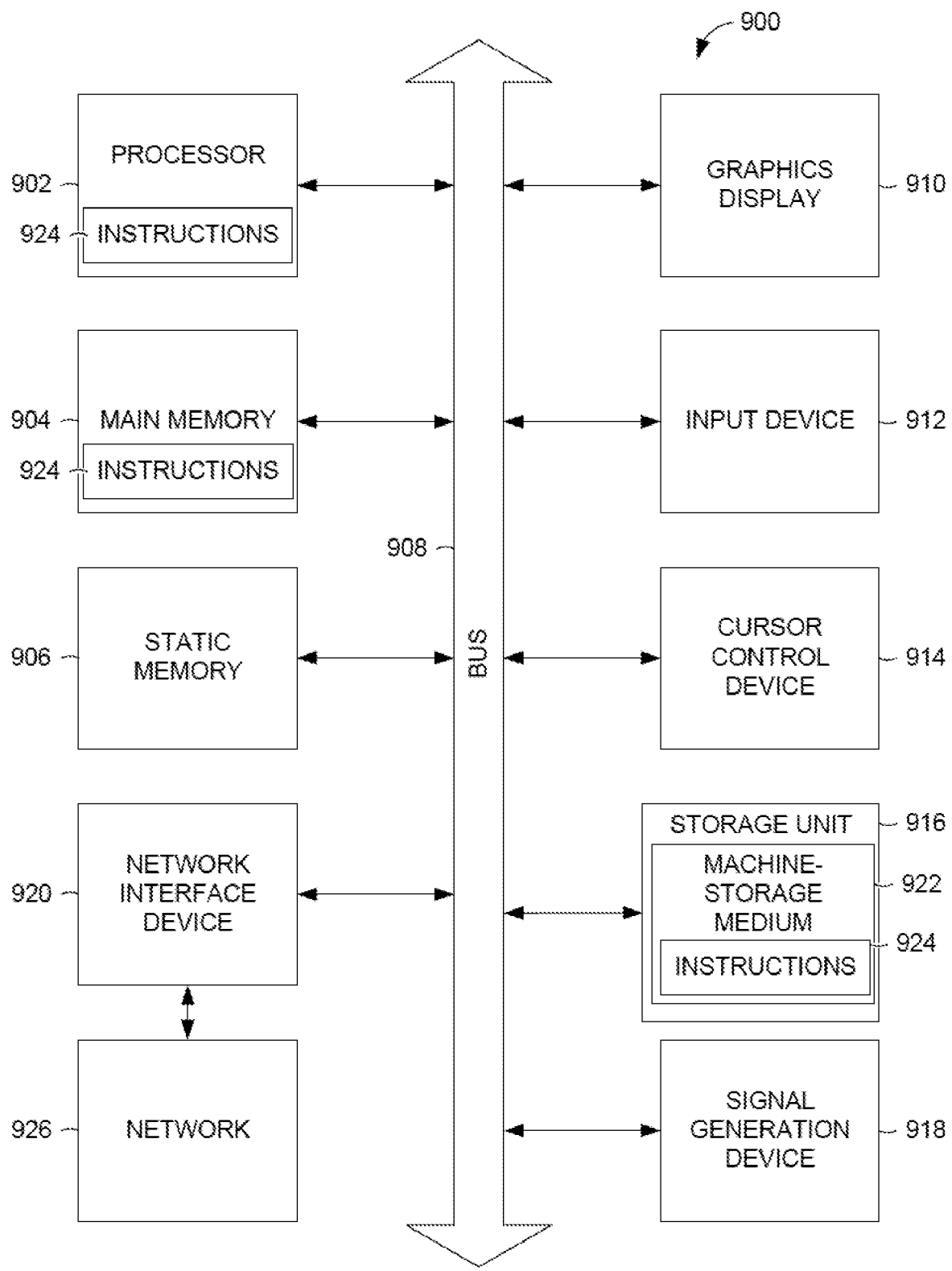
FIG. 9 is a block diagram illustrating components of a machine, according to some example embodiments, able to read instructions from a machine-storage medium and perform any one or more of the methodologies discussed herein.

FIG. 9 illustrates components of a machine 900, according to some example embodiments, that is able to read instructions from a machine-storage medium (e.g., a machine storage device, a non-transitory machine-readable storage medium, a computer storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flowchart of FIG. 7 and FIG. 8. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-storage medium 922 (e.g., a tangible machine-readable storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered as machine-readable media (e.g., tangible and non-transitory machine-readable media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using the transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for generating feedback for a webpage based on visual interactions on the webpage. The method comprises receiving, by a server associated with a webpage over a network, an indication of a selection of an edit trigger displayed on a user interface (UI) that is displaying the webpage; in response to the receiving of the selection of the edit trigger, configuring, by the server, the webpage to receive feedback from the user, the feedback comprising one or more user inputs applied directly to the webpage; receiving, by the server, the one or more user inputs applied directly to the webpage, each user input being associated with an identifier of the webpage, coordinates of a location of the user input within the webpage, and a user edit that indicates the feedback; processing, by one or more hardware processors of the server, the one or more user inputs, the processing comprising generating a feedback preview that displays each of the one or more user inputs organized based on a corresponding feedback type; and causing presentation of the feedback preview on the device of the user, the feedback preview including one or more selectable elements to approve and submit a corresponding portion of the feedback.

In example 2, the subject matter of example 1 can optionally include wherein the processing the one or more user inputs further comprises determining the feedback type based on the identifier of the webpage and the coordinates of the location of the user input within the webpage.

In example 3, the subject matter of any of examples 1-2 can optionally include wherein the receiving the one or more user inputs and the processing occurs in real-time; and the feedback preview is displayed on a side of the webpage on the UI as the user is providing the feedback.

In example 4, the subject matter of any of examples 1-3 can optionally include wherein the receiving the one or more user inputs comprises receiving the identifier of the webpage and the location of the user input in real-time; the method further comprising based on the identifier and the location of the user input within the webpage, determining suggested feedback; and causing presentation of the suggested feedback on the UI, the suggested feedback being selectable by the user.

In example 5, the subject matter of any of examples 1-4 can optionally include wherein the receiving the one or more user inputs comprise receiving a drag and drop operation to move a component displayed on the webpage to a different location, the feedback indicating a user preference for the component to be displayed at the different location.

In example 6, the subject matter of any of examples 1-5 can optionally include wherein the receiving the one or more user inputs comprise receiving an edit to text originally displayed on the webpage.

In example 7, the subject matter of any of examples 1-6 can optionally include wherein the one or more user inputs include a free-hand drawing made to an item in an image shown on the webpage and a comment entered in a comment box located proximate to the free-hand drawing; and the processing further comprises performing an image look up based on the free-hand drawing to identify a similar item to the item in the image.

In example 8, the subject matter of any of examples 1-7 can optionally include wherein a user input of the one or more user inputs is entered on the webpage by highlighting text on the webpage and providing a comment directed to the highlighted text, the comment being entered in a comment box located proximate to the highlighted text.

In example 9, the subject matter of any of examples 1-8 can optionally include wherein a user input of the one or more user input comprises highlighted text on the webpage.

In example 10, the subject matter of any of examples 1-9 can optionally include receiving an indication of the selection of a selectable element from the one or more selectable elements to approve and submit feedback corresponding to the selectable element; and in response to receiving the indication, transmitting feedback corresponding to the selectable element to a corresponding entity based on its feedback type.

In example 11, the subject matter of any of examples 1-10 can optionally include generating one or more tags based on the one or more user inputs, each tag indicating a descriptive aspect from the feedback.

Example 12 is a system for generating feedback for a webpage based on visual interactions on the webpage. The system includes one or more hardware processors and a memory storing instructions that, when executed by the one or more hardware processors, causes the one or more hardware processors to perform operations comprising receiving, over a network, an indication of a selection of an edit trigger displayed on a user interface (UI) that is displaying a webpage; in response to the receiving of the selection of the edit trigger, configuring the webpage to receive feedback from the user, the feedback comprising one or more user inputs applied directly to the webpage; receiving the one or more user inputs applied directly to the webpage, each user input being associated with an identifier of the webpage, coordinates of a location of the user input within the webpage, and a user edit that indicates the feedback; processing the one or more user inputs, the processing comprising generating a feedback preview that displays each of the one or more user inputs organized based on a corresponding feedback type; and causing presentation of the feedback preview on the device of the user, the feedback preview including one or more selectable elements to approve and submit a corresponding portion of the feedback.

In example 13, the subject matter of example 12 can optionally include wherein the processing the one or more user inputs further comprises determining the feedback type based on the identifier of the webpage and the coordinates of the location of the user input within the webpage.

In example 14, the subject matter of any of examples 12-13 can optionally include wherein the receiving the one or more user inputs comprises receiving the identifier of the webpage and the location of the user input in real-time; and the operations further comprise based on the identifier and the location of the user input within the webpage, determining suggested feedback; and causing presentation of the suggested feedback on the UI, the suggested feedback being selectable by the user.

In example 15, the subject matter of any of examples 12-14 can optionally include wherein the receiving the one or more user inputs comprise receiving a drag and drop operation to move a component displayed on the webpage to a different location, the feedback indicating a user preference for the component to be displayed at the different location.

In example 16, the subject matter of any of examples 12-15 can optionally include wherein the receiving the one or more user inputs comprise receiving an edit to text originally displayed on the webpage.

In example 17, the subject matter of any of examples 12-16 can optionally include wherein the one or more user inputs include a free-hand drawing made to an item in an image shown on the webpage and a comment entered in a comment box located proximate to the free-hand drawing; and the processing further comprises performing an image look up based on the free-hand drawing to identify a similar item to the item in the image.

In example 18, the subject matter of any of examples 12-17 can optionally include wherein a user input of the one or more user inputs is entered on the webpage by highlighting text on the webpage and providing a comment directed to the highlighted text, the comment being entered in a comment box located proximate to the highlighted text.

In example 19, the subject matter of any of examples 12-18 can optionally include wherein the operations further comprise receiving an indication of the selection of a selectable element from the one or more selectable elements to approve and submit feedback corresponding to the selectable element; and in response to receiving the indication, transmitting feedback corresponding to the selectable element to a corresponding entity based on its feedback type.

Example 20 is a machine-storage medium for generating feedback for a webpage based on visual interactions on the webpage. The machine-storage medium configures one or more processors to perform operations comprising receiving, over a network, an indication of a selection of an edit trigger displayed on a user interface (UI) that is displaying a webpage; in response to the receiving of the selection of the edit trigger, configuring the webpage to receive feedback from the user, the feedback comprising one or more user inputs applied directly to the webpage; receiving the one or more user inputs applied directly to the webpage, each user input being associated with an identifier of the webpage, coordinates of a location of the user input within the webpage, and a user edit that indicates the feedback; processing the one or more user inputs, the processing comprising generating a feedback preview that displays each of the one or more user inputs organized based on a corresponding feedback type; and causing presentation of the feedback preview on the device of the user, the feedback preview including one or more selectable elements to approve and submit a corresponding portion of the feedback.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and datastores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   causing presentation of a webpage in a non-edit mode in which the webpage cannot receive and display visual interactions applied directly to the webpage;
   receiving an indication of a selection of an edit trigger displayed on a user interface that is displaying the webpage on which a user wants to provide feedback;
   in response to receiving the indication of the selection, configuring, by a server, the webpage to receive the feedback from the user, the configuring comprising enabling the user interface presenting the webpage to receive and display one or more user inputs applied directly to the webpage;
   receiving, by the server, an indication that the user is inputting a user input comprising a visual interaction with a component displayed on the webpage;
   responsive to receiving the indication, detecting coordinates of a location of the user input on the webpage;
   based on an identifier of the webpage and the coordinates, identifying a component on the webpage that the user is providing feedback about by comparing the identifier and the coordinates to information in a database that includes identifiers of webpages, components on each webpage, and coordinates of the components on each webpage;
   based on the identified component, generating, from one or more data sources, one or more feedback suggestions for the identified component or a similar component;
   causing presentation of the one or more feedback suggestions; and
   receiving an indication of completion of the user input or a selection of a feedback suggestion.

2. The method of claim 1, wherein the one or more feedback suggestions comprise a previously generated phrase or tag that indicates a descriptive aspect based on previous feedback.

3. The method of claim 1, wherein the one or more feedback suggestions are further based on transaction data accessed from a user profile of the user providing the feedback.

4. The method of claim 1, wherein the one or more feedback suggestions are further based on machine learning of other feedback provided from other reviewers for the location on the webpage.

5. The method of claim 1, further comprising:
generating a phrase or tag that indicates a descriptive aspect derived from the feedback from the user, the phrase or tag being used as keywords that highlight the descriptive aspect of an item or content in a subsequent webpage.

6. The method of claim 1, further comprising:
generating a feedback preview that displays the one or more user inputs grouped together based on a corresponding feedback type; and
causing presentation of the feedback preview on a device of the user.

7. The method of claim 6, wherein the feedback preview includes one or more selectable elements to approve and submit a corresponding portion of the feedback, the method further comprising:
receiving an indication of a selection of a selectable element from the one or more selectable elements to approve and submit feedback corresponding to the selectable element; and
in response to receiving the indication, transmitting feedback corresponding to the selectable element to a corresponding entity based on its feedback type.

8. The method of claim 1, further comprising:
based on the identifier of the webpage and the coordinates, identifying a feedback type for the user input.

9. The method of claim 1, wherein a user input of the one or more user inputs is entered on the webpage by highlighting text on the webpage and providing a comment directed to the highlighted text, the comment being entered proximate to the highlighted text.

10. The method of claim 1, wherein a user input of the one or more user input comprises text input on the webpage, the method further comprising using natural language processing to understand the text input and form the feedback.

11. The method of claim 1, further comprising:
processing, by one or more hardware processors of the server, the one or more user inputs, the processing including performing filtering analysis to determine whether to remove an irrelevant user input or to consolidate two or more correlated user inputs.

12. A system comprising:
one or more hardware processors; and
a memory storing instructions that, when executed by the one or more hardware processors, causes the one or more hardware processors to perform operations comprising:
causing presentation of a webpage in a non-edit mode in which the webpage cannot receive and display visual interactions applied directly to the webpage;
receiving an indication of a selection of an edit trigger displayed on a user interface that is displaying the webpage on which a user wants to provide feedback;
in response to receiving the indication of the selection, configuring the webpage to receive the feedback from the user, the configuring comprising enabling the user interface presenting the webpage to receive and display one or more user inputs applied directly to the webpage;
receiving an indication that the user is inputting a user input comprising a visual interaction with a component displayed on the webpage;
responsive to receiving the indication, detecting coordinates of a location of the user input on the webpage;
based on an identifier of the webpage and the coordinates, identifying a component on the webpage that the user is providing feedback about by comparing the identifier and the coordinates to information in a database that includes identifiers of webpages, components on each webpage, and coordinates of the components on each webpage;
based on the identified component, generating, from one or more data sources, one or more feedback suggestions for the identified component or a similar component;
causing presentation of the one or more feedback suggestions; and
receiving an indication of completion of the user input or a selection of a feedback suggestion.

13. The system of claim 12, wherein the one or more feedback suggestions comprise a previously generated phrase or tag that indicates a descriptive aspect based on previous feedback.

14. The system of claim 12, wherein the one or more feedback suggestions are further based on transaction data accessed from a user profile of the user providing the feedback.

15. The system of claim 12, wherein the one or more feedback suggestions are further based on machine learning of other feedback provided from other reviewers for the location on the webpage.

16. The system of claim 12, wherein the operations further comprise:
generating a phrase or tag that indicates a descriptive aspect derived from the feedback from the user, the phrase or tag being used as keywords that highlight the descriptive aspect of an item or content in a subsequent webpage.

17. The system of claim 12, wherein the operations further comprise:
generating a feedback preview that displays the one or more user inputs grouped together based on a corresponding feedback type; and
causing presentation of the feedback preview on a device of the user.

18. The system of claim 12, wherein the operations further comprises:
based on the identifier of the webpage and the coordinates, identifying a feedback type for the user input.

19. The system of claim 12, wherein the operations further comprise:
processing the one or more user inputs, the processing comprising performing filtering analysis to determine whether to remove an irrelevant user input or to consolidate two or more correlated user inputs.

20. A machine-storage medium storing instructions that, when executed by one or more processors of a machine, cause the one or more processors to perform operations comprising:
causing presentation of a webpage in a non-edit mode in which the webpage cannot receive and display visual interactions applied directly to the webpage;
receiving an indication of a selection of an edit trigger displayed on a user interface that is displaying the webpage on which a user wants to provide feedback;

in response to receiving the indication of the selection, configuring the webpage to receive the feedback from the user, the configuring comprising enabling the user interface presenting the webpage to receive and display one or more user inputs applied directly to the webpage;

receiving an indication that the user is inputting a user input comprising a visual interaction with a component displayed on the webpage;

responsive to receiving the indication, detecting coordinates of a location of the user input on the webpage;

based on an identifier of the webpage and the coordinates, identifying a component on the webpage that the user is providing feedback about by comparing the identifier and the coordinates to information in a database that includes identifiers of webpages, components on each webpage, and coordinates of the components on each webpage;

based on the identified component, generating, from one or more data sources, one or more feedback suggestions for the identified component or a similar component;

causing presentation of the one or more feedback suggestions; and receiving an indication of completion of the user input or a selection of a feedback suggestion.

* * * * *